(12) United States Patent
Cobb (10) Patent No.: US 12,296,992 B2
(45) Date of Patent: May 13, 2025

(54) HYBRID AIRSHIP FOR PACKAGE DELIVERY

(71) Applicant: Nathan Ian Cobb, Guthrie, OK (US)

(72) Inventor: Nathan Ian Cobb, Guthrie, OK (US)

( * ) Notice: Subject to any disclaimer, the term of this patent is extended or adjusted under 35 U.S.C. 154(b) by 30 days.

(21) Appl. No.: 18/305,321

(22) Filed: Apr. 21, 2023

(65) Prior Publication Data

US 2023/0339629 A1    Oct. 26, 2023

Related U.S. Application Data

(60) Provisional application No. 63/333,504, filed on Apr. 21, 2022.

(51) Int. Cl.
| | | |
|---|---|---|
| *B64U 10/30* | (2023.01) | |
| *B64B 1/32* | (2006.01) | |
| *B64B 1/38* | (2006.01) | |
| *B64B 1/66* | (2006.01) | |
| *B64U 101/64* | (2023.01) | |

(52) U.S. Cl.
CPC ............ *B64U 10/30* (2023.01); *B64B 1/32* (2013.01); *B64B 1/38* (2013.01); *B64B 1/66* (2013.01); *B64B 2201/00* (2013.01); *B64U 2101/64* (2023.01)

(58) Field of Classification Search
CPC .... B64B 1/30; B64B 1/32; B64B 1/38; B64B 1/66; B64U 10/30
See application file for complete search history.

(56) References Cited

U.S. PATENT DOCUMENTS

| | | |
|---|---|---|
| 4,085,912 A | 4/1978 | Slater |
| 4,188,000 A | 2/1980 | Dalziel |
| 8,622,337 B2 * | 1/2014 | Hariri ...................... B64B 1/22 |
| | | 244/30 |
| 9,352,819 B2 | 5/2016 | Smith et al. |
| 9,802,690 B2 | 10/2017 | Goelet et al. |
| 2017/0021915 A1 | 1/2017 | Vaughn et al. |
| 2017/0233053 A1 | 8/2017 | High et al. |
| 2020/0207474 A1 | 7/2020 | Foggia et al. |
| 2020/0262536 A1 * | 8/2020 | Deakin ................... B64B 1/20 |

FOREIGN PATENT DOCUMENTS

DE    102017129101 A1 *  6/2019  ............ B25J 13/065

OTHER PUBLICATIONS

Image and translation of DE-102017129101-A1 (Year: 2019).*

* cited by examiner

*Primary Examiner* — Nicholas McFall (57) ABSTRACT

An unmanned hybrid airship for delivering packages, featuring: a forward cargo bay counterbalanced by a moveable counterweight; and a gripping mechanism for engaging unconventional mooring structures such as balcony rails and window sills. Other embodiments are described.

3 Claims, 8 Drawing Sheets

HYBRID AIRSHIP FOR PACKAGE DELIVERY

CROSS-REFERENCE TO RELATED APPLICATIONS

See Application Data Sheet (ADS)

FEDERALLY SPONSORED RESEARCH

Not applicable

PARTIES TO A JOINT RESEARCH AGREEMENT

Not Applicable

SEQUENCE LISTING OR PROGRAM

Not Applicable

BACKGROUND

The delivery of packages using Unmanned Aerial Vehicles (UAVs) has emerged as a potential alternative and/or supplement to traditional package delivery methods. Given the variety of the types of homes and businesses that are serviced by traditional package delivery methods, it stands to reason that any UAV attempting to insert itself into the current package delivery market should be capable of safely delivering packages not just to yards or clear landing areas but to a variety of commercial and residential structures including hotels, apartments, and condominiums, most of which are inaccessible to current state-of-the-art package delivery UAVs.

BRIEF DESCRIPTION OF DRAWINGS

The disclosure below refers to the accompanying drawings, wherein like reference numerals refer to like parts throughout the drawings and in which.

DETAILED DESCRIPTION

In accordance with one embodiment, FIGS. 1, 2, 3, 4, 5, and 6 depict a battery powered, autonomously controlled hybrid airship 10 comprising a hull 12, an airframe 14, a plurality of propulsion units 16, a cargo bay 18, a counterweight 20, a weight balancing sled 22, and a gripping mechanism 24.

Figure 1:
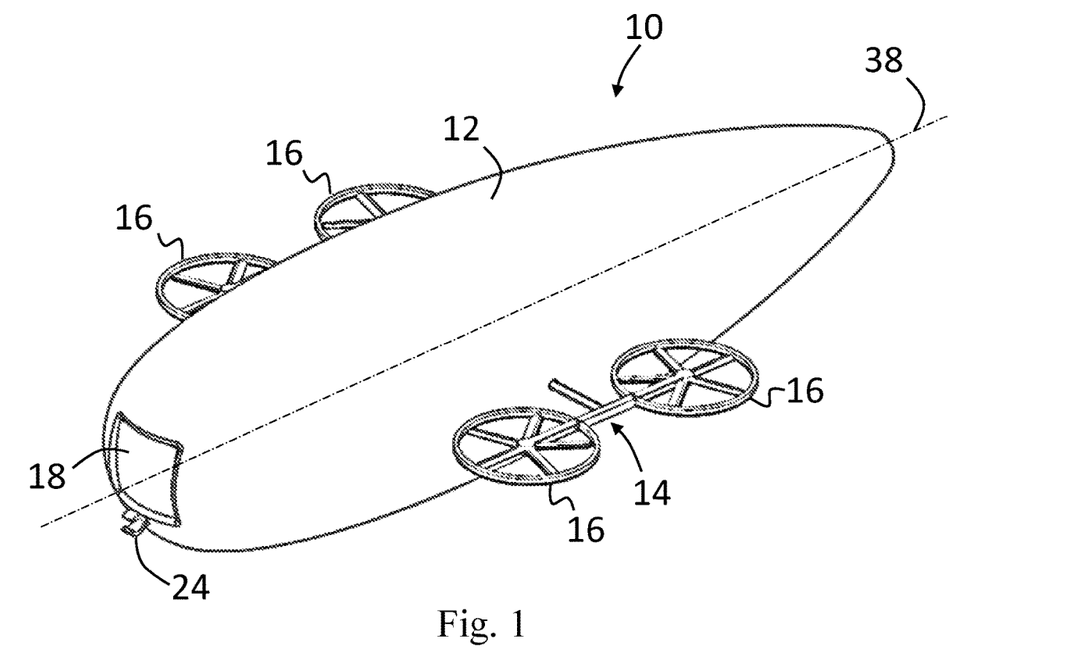
FIG. 1 depicts a perspective view of a hybrid airship in accordance with one embodiment.
Figure 2:
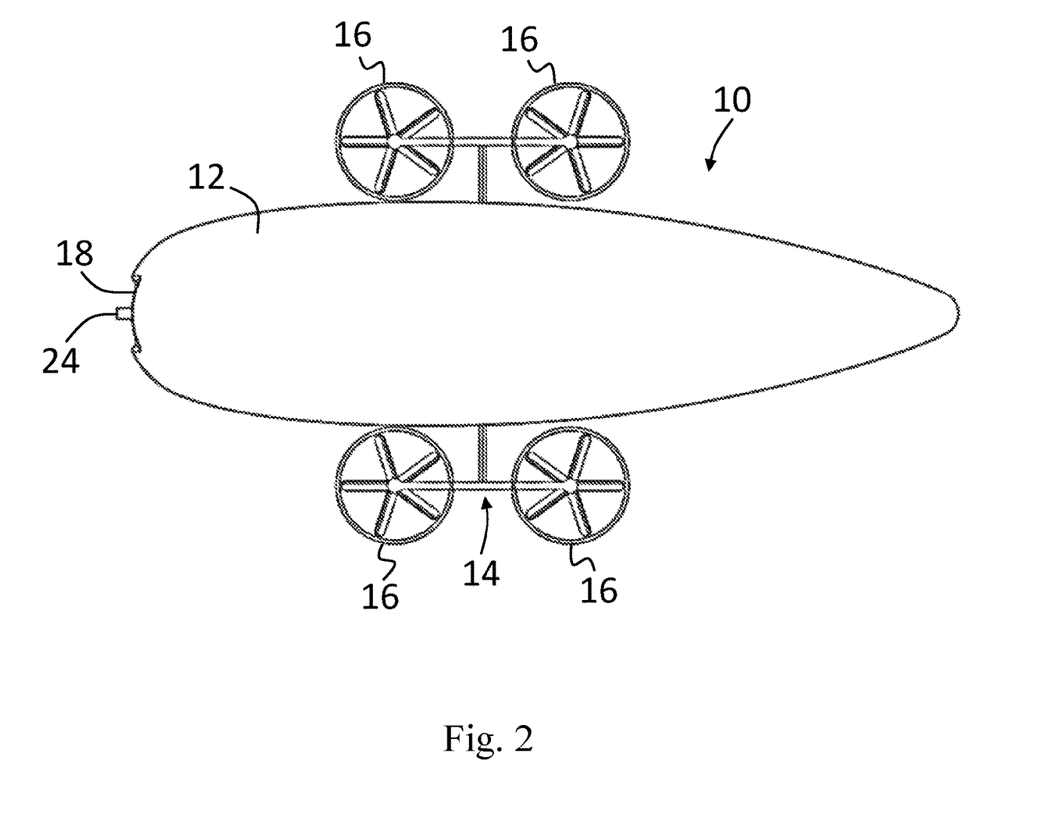
FIG. 2 depicts a top plan view of a hybrid airship in accordance with one embodiment.
Figure 3:
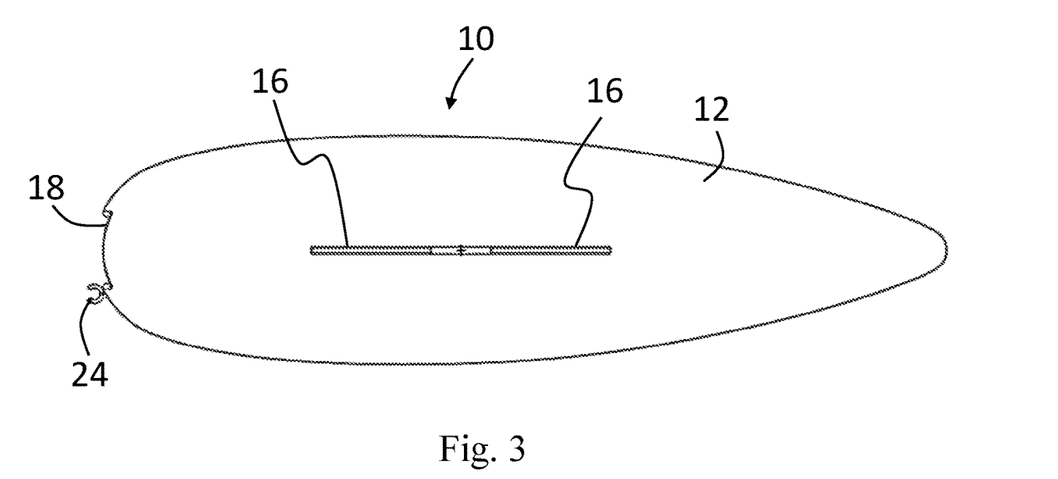
FIG. 3 depicts a side elevation view of a hybrid airship in accordance with one embodiment.

The hull 12 is approximately 18 feet in length, measured along its longitudinal axis 38, with a bulbous forward portion and a tapered aft portion giving the hull 12 a thick airfoil-shaped side profile (FIG. 1). The hull 12 is made from a lightweight fabric coated with polyurethane to render it sufficiently impermeable to a lifting gas such as helium. The hull 12 is inflated to shape by a lifting gas such as helium.

Figure 4:
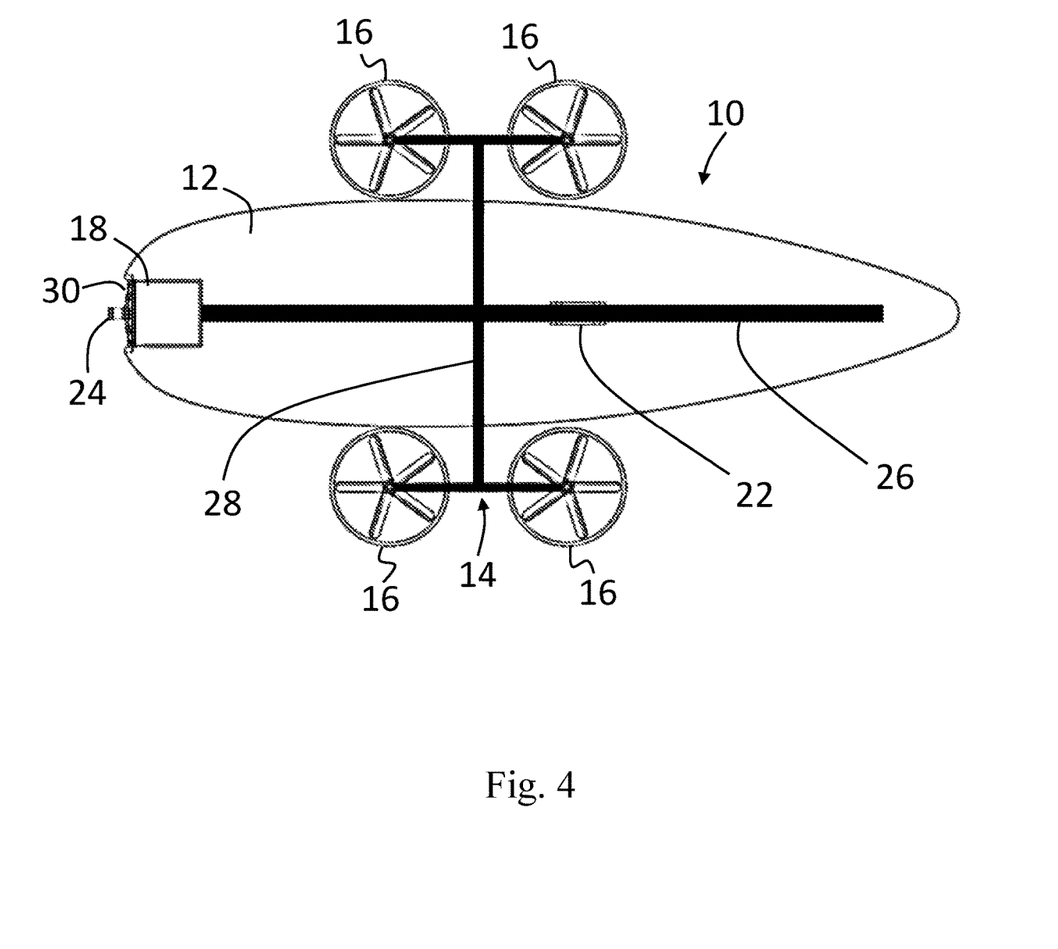
FIG. 4 depicts a top plan view of a hybrid airship in accordance with one embodiment with its internal structure revealed.

The airframe 14 comprises a keel 26 running longitudinally inside the hull 12 and a spar 28 spanning the width of the hull 12 and extending through sealed penetrations in each side of the hull 12 (FIG. 4). The keel 26 and the spar 28 are joined at their intersection and are integrated with the hull 12 by way of various tension members, webs, and/or minor spars (not pictured). The airframe 14 is primarily constructed from lightweight carbon fiber composite components.

Figure 6:
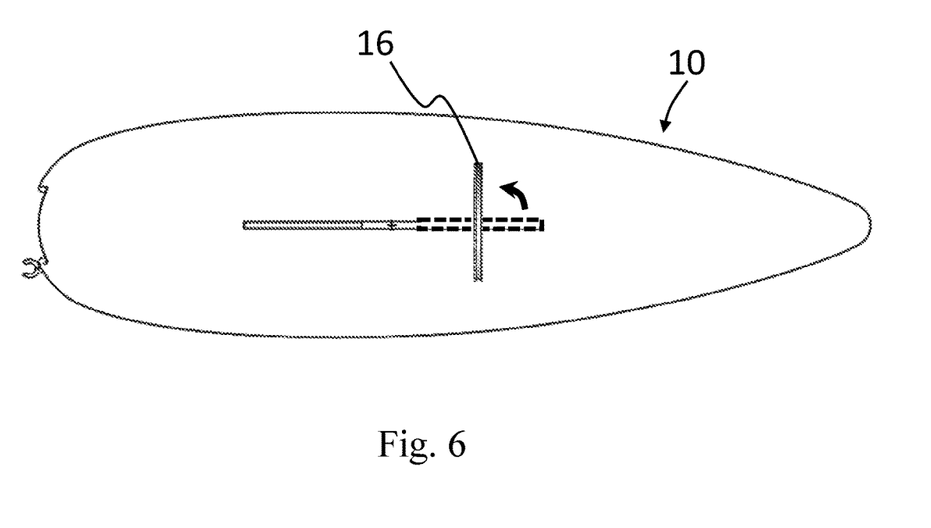
FIG. 6 depicts a side elevation view of a hybrid airship in accordance with one embodiment showing the swiveling of one of its propulsion units.

Each propulsion unit 16 comprises an electric motor, a propeller, and a propeller shroud. The propulsion units 16 are mounted to the spar 28 and are oriented to produce lift. One or more propulsion units 16 on each side of the hybrid airship 10 are pivotably mounted to the spar 28 such that these propulsion units 16 are able to swivel (FIG. 6).

Figure 5:
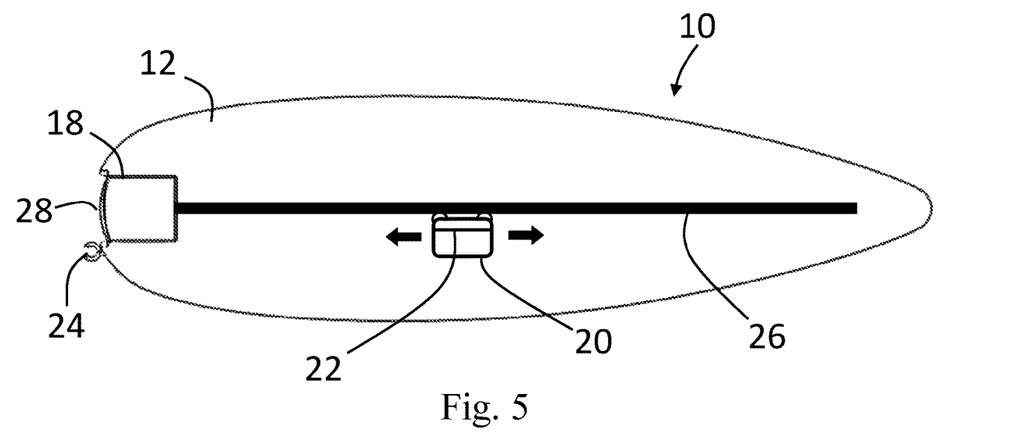
FIG. 5 depicts a side elevation view of a hybrid airship in accordance with one embodiment with its internal structure revealed.

The cargo bay 18 comprises a hollow box-like structure with one open end accessible through a hingedly mounted door 30 (FIG. 5). The cargo bay 18 is integrated with the forward longitudinal extremity of the hull 12 and coupled to the keel 26. The cargo bay 18 is constructed primarily from lightweight carbon fiber composites.

The counterweight 20 comprises a box-like enclosure containing the batteries that power the propulsion units 16 and other electrical components of the hybrid airship 10. The counterweight 20 weighs approximately 10 pounds and is coupled to the weight balancing sled 22 (FIG. 5). Power from the batteries is carried by an umbilical cable (not pictured) with a sufficient amount of slack to accommodate the movement of the counterweight 20.

The weight balancing sled 22 constitutes an automated means for longitudinally translating the counterweight 20 (FIG. 5). The weight balancing sled 22 comprises a wheeled carriage driven by a stepper motor. The weight balancing sled 22 is coupled to the keel 26 such that the keel 26 acts as a rail, allowing the weight balancing sled 22 to drive itself fore and aft along the length of the keel 26. The weight balancing sled 22 is assembled from lightweight carbon fiber composite components and the wheels of the weight balancing sled 22 are made from rubber.

The gripping mechanism 24 constitutes a means for mechanically grasping structures suitable for mooring. The gripping mechanism 24 comprises a mechanical robotic claw actuated by a servo. The gripping mechanism 24 is integrated with the hull 12 proximate to the cargo bay 18 (FIG. 5). The gripping mechanism 24 is assembled primarily from lightweight carbon fiber composite components and is sheathed in silicone foam or other similar soft material.

Operation

The hybrid airship 10, as its term of art name suggests, is a heavier-than-air airship that derives some of its lift from the hydrostatic force (buoyancy) of the lifting gas inside the hull 12, and derives the remainder of its lift from the propulsion units 16 configured to produce lift and/or the aerodynamic lift generated by air flowing over the hull 12 in forward flight. One of the benefits of this hybrid lift approach is that the propulsion units 16 of the hybrid airship 10 expend less energy and produce less noise to lift a given package weight, compared to a conventional package delivery UAV.

The propulsion units 16 enable the hybrid airship 10 to hover, ascend, descend, and maneuver like a conventional multi-rotor helicopter (e.g., a quadcopter UAV). The hybrid airship 10 can also propel itself forward by pivoting two or more of its propulsion units 16 to aim thrust rearward (FIG. 6).

Figure 7A:
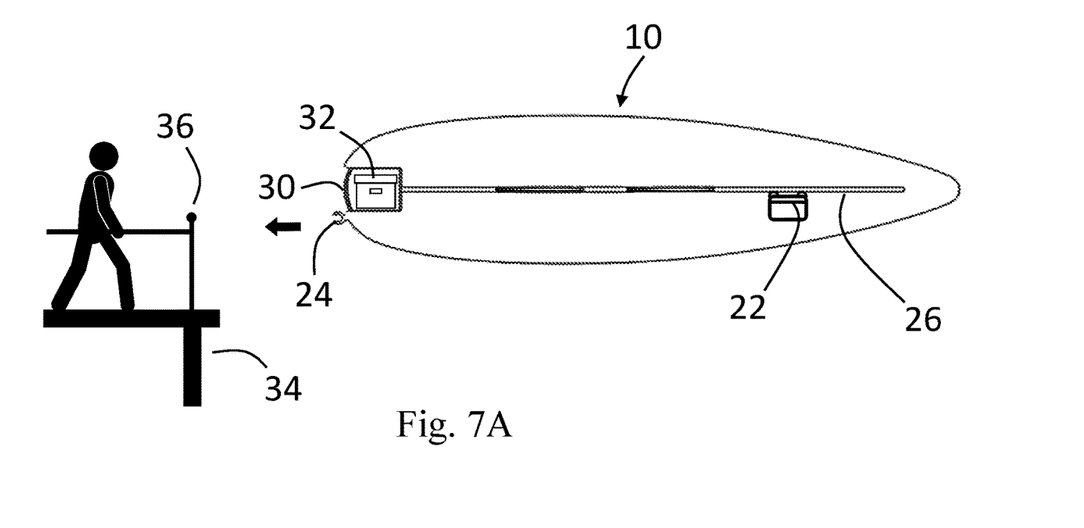
FIGS. 7A, 7B, 7C, 7D, & 7E depict a side elevation view of a hybrid airship in accordance with one embodiment performing a package delivery to a balcony.

The cargo bay 18 is sized to accommodate one or more packages such as pizza boxes, a bag of groceries, fast-food orders, etc. FIG. 7A depicts a generic package 32 inside the cargo bay 18. The benefit of locating the cargo bay 18 at the forward longitudinal extremity of the hull 12 is that the cargo bay 18 is easily accessible for loading and unloading packages. This cargo bay configuration, however, is not employed by airships because it necessarily results in large weight imbalances when cargo is loaded and unloaded from a longitudinal extremity of the airship.

The gripping mechanism 24 mechanically engages balcony handrails or other suitable mooring features, such as window sills, to securely brace the hybrid airship 10 during a package delivery or pick-up. The benefit of this mooring approach is that the hybrid airship 10 is able to autonomously moor to existing structures that were not specifically designed for the purpose but are suitable, nonetheless.

The weight balancing sled 22 drives itself forward or aft along the keel 26 as required to balance large shifts in the weight distribution of the hybrid airship 10 resulting from loading and unloading packages from the cargo bay 18. This automated means for balancing large shifts in the weight distribution of the hybrid airship 10 enables the hybrid airship 10 to exploit the benefits of integrating the cargo bay 18 at the forward longitudinal extremity of the hull 12.

Figure 7B:
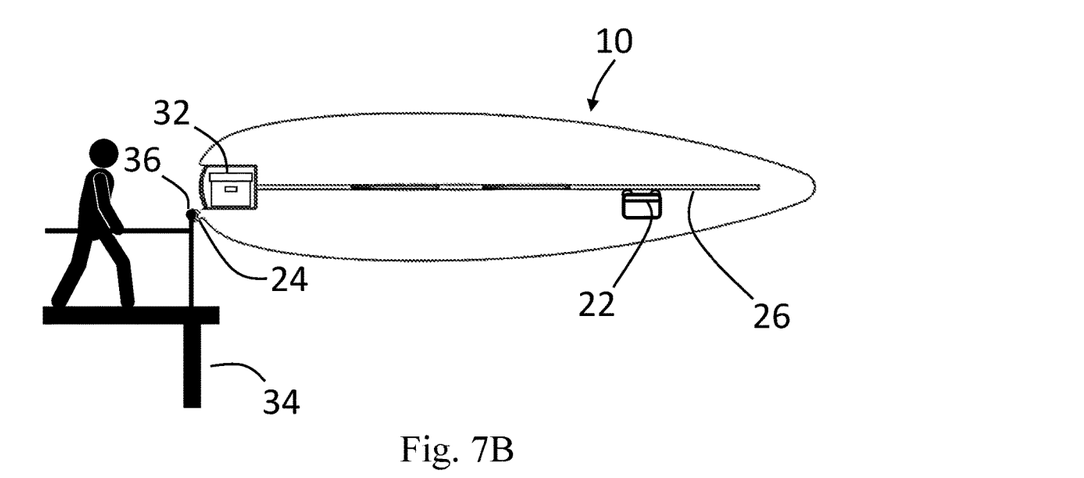
Figure 7C:
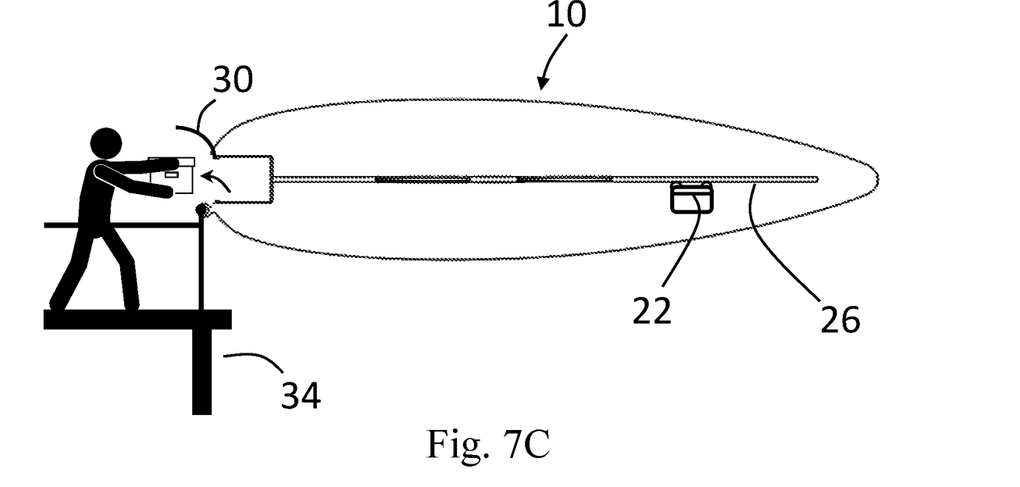
Figure 7D:
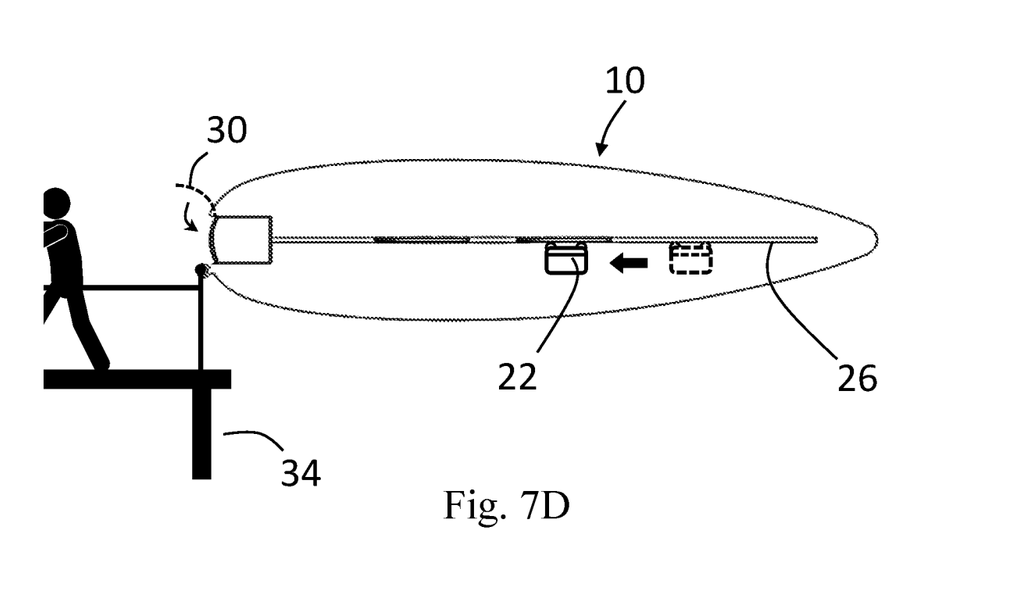
Figure 7E:
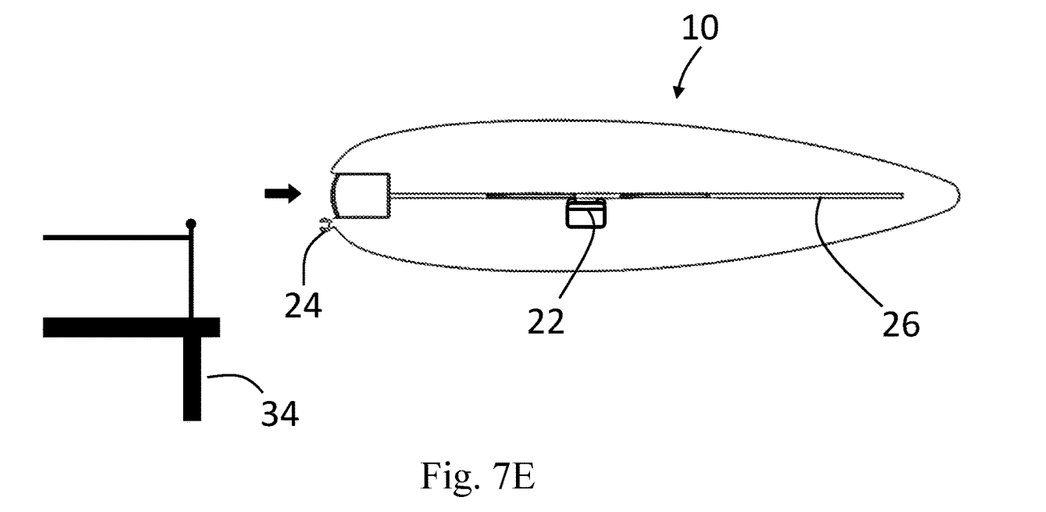

FIGS. 7A, 7B, 7C, 7D, and 7E depict a cutaway view of the hybrid airship 10 during a typical package delivery to a person on a balcony. First, the hybrid airship 10 slowly approaches the balcony 34 (FIG. 7A). Next, the gripping mechanism 24 clamps onto the balcony handrail 36 which securely moors the hybrid airship 10 to the balcony (FIG. 7B). Once the hybrid airship 10 is moored, the forward cargo bay door 30 is opened and the package 32 is removed by the person on the balcony (FIG. 7C). The removal of the package 32 causes the weight distribution of the hybrid airship 10 to shift rearward. To re-balance the weight distribution of the hybrid airship 10, the weight balancing sled 22 automatically moves forward along the keel 26 until balance is restored. Finally, the gripping mechanism 24 releases from the balcony handrail 36 and the hybrid airship 10 slowly backs away.

Other Embodiments

Those of ordinary skill in the art will understand and appreciate the existence of alternatives, variations, combinations, and equivalents of the specific embodiment herein. The subject of the disclosure should therefore not be limited by the above-described embodiment, but by all embodiments and methods within the scope and spirit of the disclosure. Such embodiments may include but are not limited to:

Variations in or additions or subtractions to aerodynamic features of the hybrid airship 10 including but not limited to fins, lifting surfaces, stability and control features, vortex generators, chines, etc., or any combination thereof.

Variations in or additions or subtractions to alighting and handling features of the hybrid airship 10 including but not limited to landing skids, landing gear, handles, tiedowns, etc., or any combination thereof.

Variations in or additions or subtractions to the method of controlling the hybrid airship 10, including but not limited to employing local autonomous control, remote autonomous control, remote manual control, or any combination thereof.

Variations in or additions or subtractions to the power supply of the hybrid airship 10 including but not limited to employing batteries, fuel cells, internal combustion engines, etc., or any combination thereof.

Variations in or additions or subtractions to the quantity and/or arrangement of propulsion units 16, including but not limited incorporating one or more propulsion units 16 dedicated to providing longitudinal thrust, lateral thrust, or any combination thereof.

Variations in or additions or subtractions to the articulation of one or more of the propulsion units 16 including but not limited to incorporating single or multi-axis gimbaling.

Variations in or additions or subtractions to the actuation of one or more of the propulsion units 16 including but not limited to employing servos, solenoids, etc., or any combination thereof.

Variations in or additions or subtractions to the type of propulsion units 16 including but not limited to employing shrouded propellers, ducted propellers, jets, ducted fans, fixed pitch propellers, variable pitch propellers, etc., or any combination thereof.

Variations in or additions or subtractions to the mounting scheme of the propulsion units 16 including but not limited to bracing the propulsion units 16 directly to the hull 12 using guy wires, coupling the propulsion units 16 to internal or external airframe structures, etc., or any combination thereof.

Variations in the shape, size, and configuration of the hull 12 including but not limited to configurations employing multi-lobe hulls, single-lobe hulls, tandem hulls, single hulls, spherical hulls, disc-shaped-hulls, animal-shaped hulls, cartoon character shaped hulls, etc., or any combination thereof.

Variations in the type of lifting gas employed to fill the hull 12 including but not limited to helium, hydrogen, nitrogen, etc., or any combination thereof.

Variations in the construction material of the hull 12 including but not limited to employing coated ripstop fabric, nylon, Polyurethane, PVC, etc., or any combination thereof.

Variations in the configuration of the cargo bay 18 including but not limited to incorporating alternate shapes, sizes, structural supports, door 30 configurations, etc., or any combination thereof.

Variations in or additions to the functionality of the forward cargo bay 18 including but not limited to the incorporation of refrigeration, heating, package ejection mechanisms, package winches, etc., or any combination thereof.

Variations in the integration of the cargo bay 18 with the hull 12, including but not limited to mounting the cargo bay 18 exterior to the hull 12, fully or partially submerging the cargo bay 18 within the hull 12, locating the cargo bay 18 at the forward longitudinal extremity of the hull 12, locating the cargo bay 18 at the aft longitudinal extremity of the hull 12, etc., or any combination thereof.

Variations in the construction material of the cargo bay 18 including but not limited to employing carbon fiber composites, fiberglass composites, plastics, foams, metal, etc., or any combination thereof.

Variations in or additions or subtractions to the configuration of the airframe 14, including employing an internal airframe, an external airframe, varying the number and configuration of spars 28, the number and configuration of keels 26, the number and configuration of secondary structures used to support the hybrid airship 10 systems, including the propulsion units 16.

Variations in the construction material of the airframe 14 including but not limited to employing carbon fiber composites, fiberglass composites, plastics, wood, bamboo, metal, etc., or any combination thereof.

Alternate means, designs, configurations, and/or substitutions for the weight balancing sled 22 that accomplish the automated function of repositioning the counterweight 20 as required to adjust the balance of the hybrid airship 10.

Variations in the location and integration of the weight balancing sled 22, including but not limited to mounting and supporting the weight balancing sled 22 inside the hull 12, outside the hull 12, or a combination thereof.

Variations in or additions or subtractions to the configuration of the drive mechanism of the weight balancing sled 22 including but not limited to employing belts, pullies, ropes, wires, stepper motors, elastomeric bands, etc., or any combination thereof.

Variations in the construction material of the weight balancing sled 22 including but not limited to employing carbon fiber composites, fiberglass composites, plastics, wood, bamboo, metal, etc., or any combination thereof.

Variations in or additions or subtractions to the design, configuration, and/or constituents of the counterweight 20, including but not limited to incorporating batteries, fuel tanks, electronics, ballast weights, etc., or any combination thereof sufficient to achieve the desired form and weight.

Alternate means, designs, configurations, and/or substitutions for the gripping mechanism 24 that accomplish the function of grasping structural features suitable for mooring the hybrid airship 10. Alternate configurations for the grasping mechanism include but are not limited to designs employing suction cups, magnets, temporary adhesives, etc., or any combination thereof.

Variations in the integration of the gripping mechanism 24 with the hybrid airship 10, including but not limited to coupling the gripping mechanism 24 to the hull 12, the cargo bay 18, the airframe 14, etc., or any combination thereof.

Variations in the construction materials of the gripping mechanism 24 including but not limited to employing carbon fiber composites, fiberglass composites, plastics, wood, bamboo, foam, silicone, metal, etc., or any combination thereof.

CONCLUSION AND SCOPE

Accordingly, the reader will see that at least one embodiment of the subject of the present disclosure provides a hybrid airship suited for the delivery of packages to a variety of commercial and residential structures including hotels, apartments, and condominiums.

While the above description contains much specificity, these details should not be construed as limitations in the scope of any embodiment, but as illustrative exemplifications of various embodiments thereof. Further still, it should be appreciated that various modifications may be made to the subject of the present disclosure without deviating from the spirit and scope of the appended claims.

What is claimed is:

1. An unmanned hybrid airship for package delivery, comprising:
   a hull;
   a cargo bay;
   a plurality of propulsion units;
   a counterweight; and
   an automated means for longitudinally translating said counterweight, wherein:
      said cargo bay is integrated with said hull at a longitudinal extremity of said hull,
      said propulsion units are integrated with said hull and configured to provide lift,
      said counterweight is coupled to said automated means for longitudinally translating said counterweight, and
      said automated means for longitudinally translating said counterweight is integrated with said hull,
   whereby a longitudinal weight imbalance of said unmanned hybrid airship resulting from loading or unloading goods from said cargo bay is re-balanced by a commensurate automated longitudinal translation of said counterweight.

2. The unmanned hybrid airship of claim 1 further comprising a gripping mechanism integrated with said hull proximate to said cargo bay, whereby said gripping mechanism enables said unmanned hybrid airship to moor itself.

3. The unmanned hybrid airship of claim 2 wherein said gripping mechanism is a robotic claw.

* * * * *